United States Patent
Edgar

(10) Patent No.: US 8,693,714 B2
(45) Date of Patent: Apr. 8, 2014

(54) SYSTEM AND METHOD FOR CONTROLLING AN AUDIO FEATURE OF A HEARING ASSISTANCE DEVICE

(75) Inventor: Daniel Mark Edgar, Lakeville, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 13/369,054

(22) Filed: Feb. 8, 2012

(65) Prior Publication Data

US 2013/0202137 A1   Aug. 8, 2013

(51) Int. Cl.
*H04R 25/00* (2006.01)
(52) U.S. Cl.
USPC ........................................ 381/315; 381/314
(58) Field of Classification Search
USPC ........... 381/312–317, 320; 379/52; 455/556.1
See application file for complete search history.

(56) References Cited

U.S. PATENT DOCUMENTS 8,280,086 B2 * 10/2012 Topholm ........................ 381/315
8,331,592 B2 * 12/2012 Wu et al. ........................ 381/315
2005/0100182 A1   5/2005 Sykes et al.

* cited by examiner

*Primary Examiner* — Curtis Kuntz
*Assistant Examiner* — Joshua A Kaufman
(74) *Attorney, Agent, or Firm* — Schwegman, Lundberg & Woessner, P.A.

(57) ABSTRACT

A method of using a remote control application for controlling a hearing assistance device may include displaying a user interface layout on a display of a mobile device, the user interface layout including at least one user input element associated with controlling an audio feature of a hearing assistance device; receiving a selection of the at least one user input element; translating the selection of the at least one user input element into a remote signal for controlling the feature of the hearing assistance device; and transmitting the remote signal to the hearing assistance device via a transmitter attachment coupled to the mobile device.

15 Claims, 5 Drawing Sheets

SYSTEM AND METHOD FOR CONTROLLING AN AUDIO FEATURE OF A HEARING ASSISTANCE DEVICE

FIELD OF THE INVENTION

The present disclosure relates generally to remotely controlling features of a hearing assistance device.

BACKGROUND

Hearing assistance devices include the capability to receive audio from a variety of sources. For example, a hearing assistance device may receive audio from a transmitter attached to a TV of a user of the hearing assistance device. To control the audio received from the transmitter, the user may use a remote control.

BRIEF DESCRIPTION OF THE DRAWINGS

Some embodiments are illustrated by way of example and not limitation in the figures of the accompanying drawings in which.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are illustrated in enough detail to enable those skilled in the art to practice the invention. The embodiments may be combined, other embodiments may be utilized, or structural, logical, and electrical changes may be made without departing from the scope of the present invention. The following detailed description is, therefore, not to be taken in a limiting sense, and the scope of the present invention is defined by the appended claims and their equivalents. In this document, the terms "a" or "an" are used, as is common in patent documents, to include one or more than one. In this document, the term "or" is used to refer to a nonexclusive or, unless otherwise indicated.

Hearing aids (also referred to as hearing assistance devices) detect sound using a microphone, modify the sound using a digital signals processor, and output the modified sounds using a speaker of the hearing aid. In some instances, the hearing aid may directly receive an audio stream from an external audio streaming device. For example, consider an audio streaming device connected to a TV. The audio signal, which is generally emanated from the speakers of the TV, is routed to an audio input of the audio streaming device. Then, the audio signal is broadcast from the audio streaming device over a specified radio frequency (RF) (e.g., 900 MHz). The hearing aid receives the transmitted audio signal and plays it back using the speaker of the hearing aid. However, in order to control (e.g., stop/start) audio playback of the audio streaming device an external remote control is used. Thus, the wearer of the hearing aid may need to keep a separate device around to control playback of the audio.

Increasingly, users use mobile devices to store and playback their music. In order for a hearing aid user to listen to this music, the user may need a audio streaming device, as discussed with respect to a TV, with the audio outputted from the mobile device into the audio streaming device. In other words, a hearing aid user may need to have at least two extra devices, the audio streaming device and remote control, to listen to and control playback of music stored on the mobile device.

Figure 1:
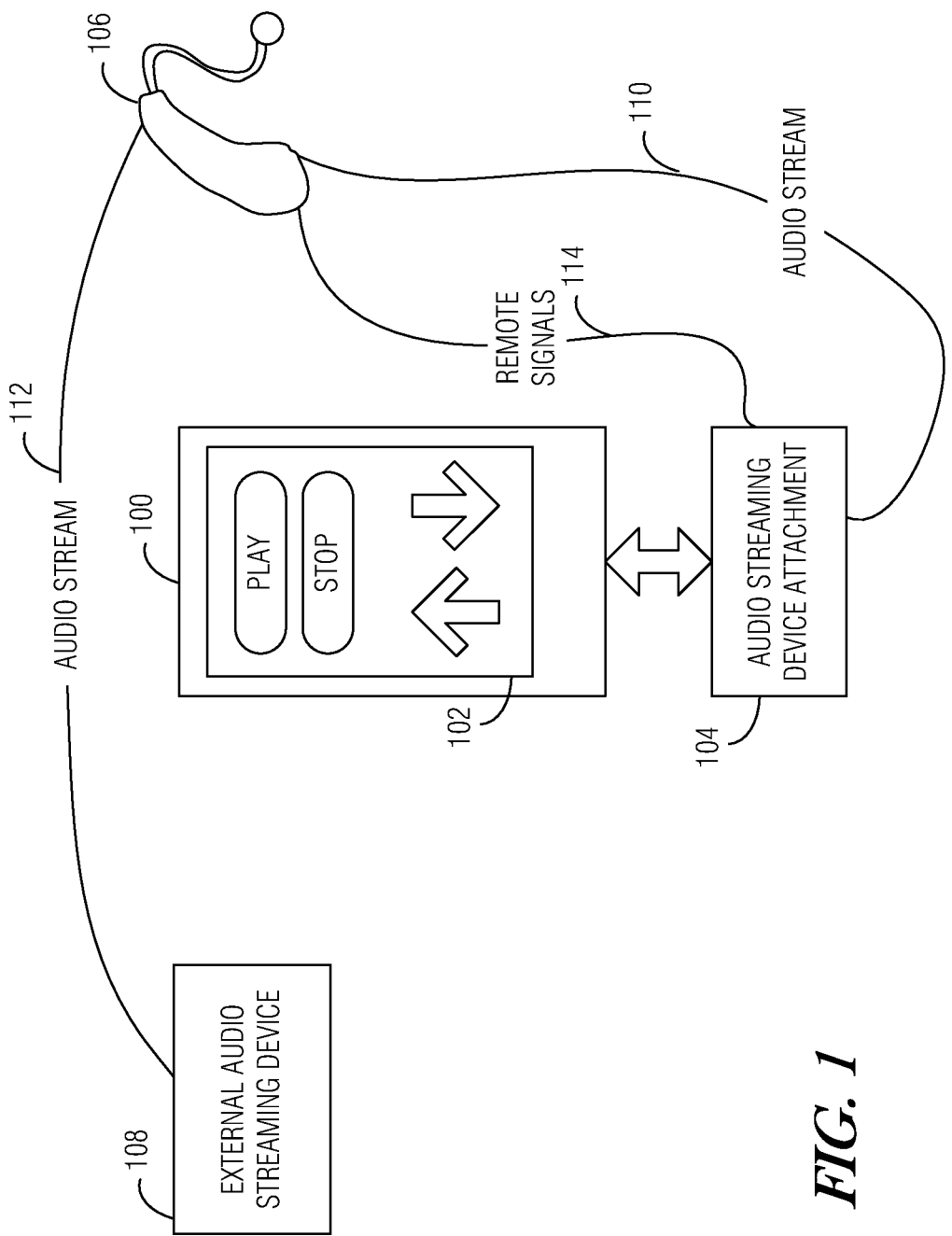
FIG. 1 illustrates an overview of a system for controlling features of a hearing aid using a mobile device, according to an example embodiment.

FIG. 1 illustrates an overview of an example system for controlling audio features of a hearing aid using a mobile device. Illustrated are mobile device 100, remote control application 102, audio streaming device attachment 104, hearing aid 106, and external audio streaming device 108. Further illustrated are audio streams 110, 112, and remote signal 114.

In an embodiment, audio steaming device attachment 104 and external audio streaming device 108 each have a radio transmitter that transmit audio streams 110, 112, respectively, to a receiver of hearing aid 106. Audio streams 110, 112 may be transmitted over a RF (e.g., 900 MHz, Bluetooth frequencies, 802.11x frequencies) that is common to audio streaming devices 104, 108 and the receiver of hearing aid 106. In an embodiment, external audio streaming device 108 may receive an audio stream through an audio input of the audio streaming device from a TV or other audio outputting device. The received audio is then transmitted over the common RF to hearing aid 106. Other communication methods may be used between devices depicted in FIG. 1 such as using portions of the infrared spectrum.

In an embodiment, audio streaming device attachment 104 is coupled to mobile device 100 through a hardware interface. When coupled, mobile device 100 and audio streaming device attachment 104 exchange data enabling audio streaming device attachment 104 to transmit audio stream 110 and remote signals 114 to hearing aid 106. For example, a user may enable music playback of a song stored on mobile device 100 and the audio data of the song may be transferred to audio streaming device attachment 104 where it is broadcasted over the RF to hearing aid 106.

In an embodiment, a hearing aid wearer, not shown, uses the user interface of remote control application 102 to control audio features of hearing aid 106 associated with the playback of audio streams 110, 112. For example, the wearer may use a "volume up" input element of the user interface to increase the volume being outputted by hearing aid 106 received from external audio streaming device 108 or mobile device 100. Thus, a hearing aid wearer may only need to carry a mobile device in order to listen to and control audio playback of music through his or her hearing aid.

Figure 2:
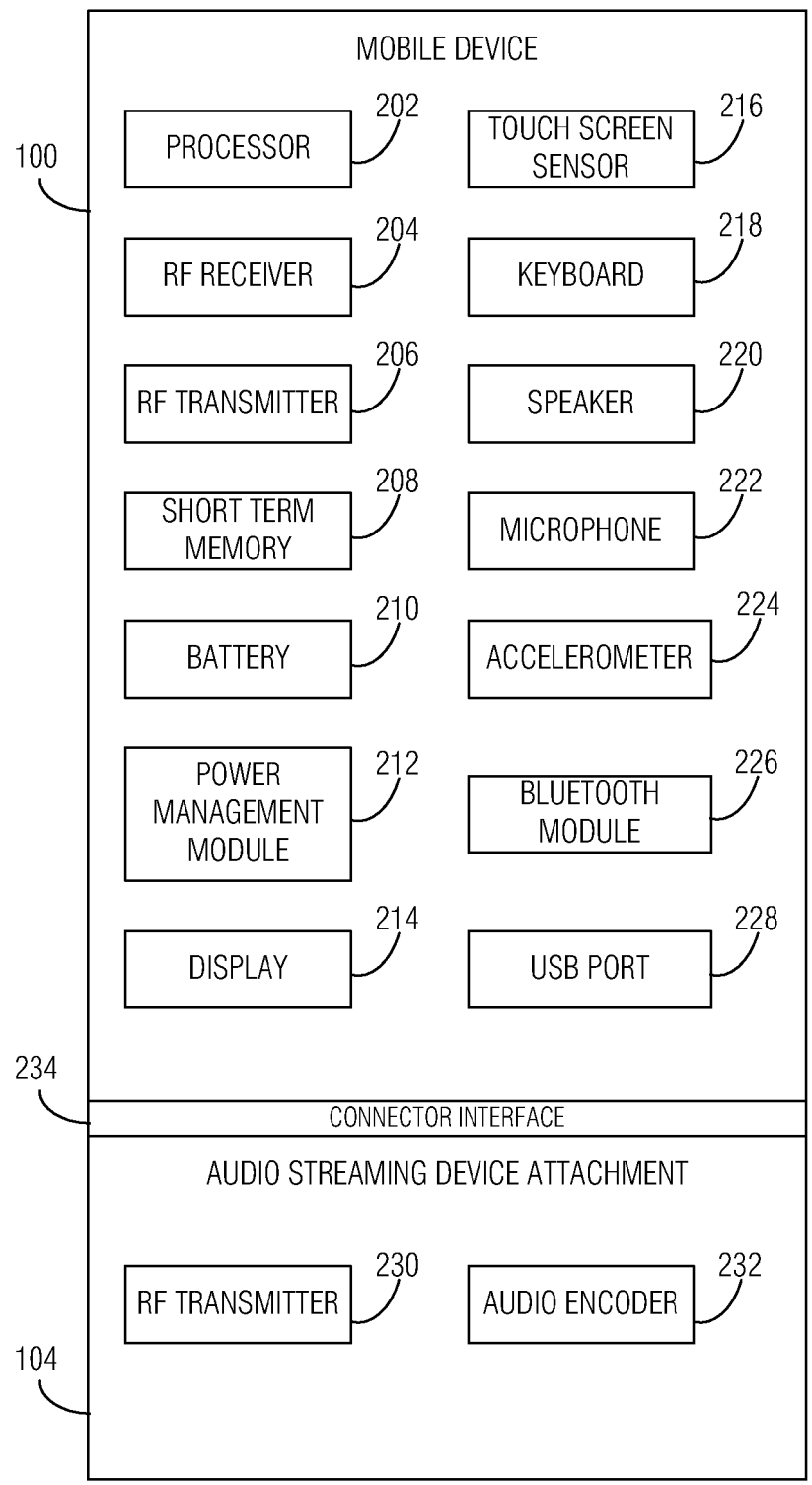
FIG. 2 illustrates a block diagram of a mobile device and audio streaming device attachment, according to an example embodiment.

FIG. 2 illustrates a block diagram of mobile device 100 and audio streaming device attachment 104. In various embodiments, audio streaming device attachment 104 may be referred to as a transmitter attachment. Mobile device 100 is shown with processor 202 that controls the overall functions of the mobile device such as running applications and controlling peripherals. Processor 202 may be any type of processor including RISC, CISC, VLIW, MISC, OISC, and the like. Processor 202 may include a Digital Signal Processor ("DSP"). Processor 202 communicates with RF receiver 204 and RF transmitter 206 to transmit and receive wireless signals such as cellular, Bluetooth, and WiFi signals. Processor 202 may use short term memory 208 to store operating instructions and help in the execution of the operating instructions such as the temporary storage of calculations and the like. Processor 202 may also use non-transitory storage to read instructions, files, and other data that requires long term, non-volatile storage.

Mobile device 100 includes battery 210 or other power source with associated power management processes. Power management module 212 distributes power from battery 210 to the other various components such as external audio streaming device 108. Power management module 212 may also convert the power from battery 210 to match the needs of the various components. Power may also be derived from alternating or direct current supplied from a power network.

In an embodiment, processor 202 communicates and controls other peripherals, such as display 214 with associated touch screen sensor 216. Processor 202 causes images to be displayed on display 214 and receives input from touch screen sensor 216 when a user presses on the touch-screen display. In some examples touch screen sensor 216 may be a multi-touch sensor capable of distinguishing, and processing gestures.

In various embodiments, processor 202 receives input from a keyboard 218 (e.g., physical or virtual). Processor 202 may produce audio output and other alerts which are played on the speaker 220 or routed to connected peripherals. Speaker 220 may also be used to play voices (in the case of a voice phone call) that have been received from RF receiver 204 and decoded by Processor 202. Microphone 222 may be used to transmit a voice for a voice call for subsequent encoding and transmission using RF Transmitter 206. Microphone 222 may also be used as an input device for commands using voice processing software. Accelerometer 224 provides input on the motion of mobile device 100 to processor 202. Accelerometer 224 may be used as in input device in motion sensitive applications. Bluetooth module 226 may be used to communicate with Bluetooth enabled external devices. In an embodiment, USB port 228 enables external connections to other devices supporting the USB standard and charging capabilities. USB port 228 may include all the functionality to connect to, and establish a connection with an external device over USB.

FIG. 2 further illustrates audio streaming device attachment 104 coupled to mobile device 100 through connector interface 234. In an embodiment, connector interface 234 provides one or more pins upon which data and power are transferred. Thus, audio streaming device attachment 104 receives power and data through connector interface 234 from mobile device 100. For example, power management module 212 may route power to audio streaming device attachment 104. Audio data may be received from mobile device 100, encoded using audio encoder 232, and transmitted using RF transmitter 230. Similarly, remote signals may be received from mobile device 100 through connector interface 234, encoded using remote signal processor, and transmitted using RF transmitter 230. In an embodiment, mobile device 100 may transit the audio data without the need for audio streaming device attachment.

In an embodiment, mobile device 100 recognizes when a component/peripheral is connected using connector interface 234. For example, upon sensing audio streaming device attachment 104 has been connected, mobile device 100 may launch an application stored on mobile device 100. In an embodiment, mobile device 100 may also begin routing power and data to audio streaming device attachment 104 upon sensing the connection.

Figure 3:
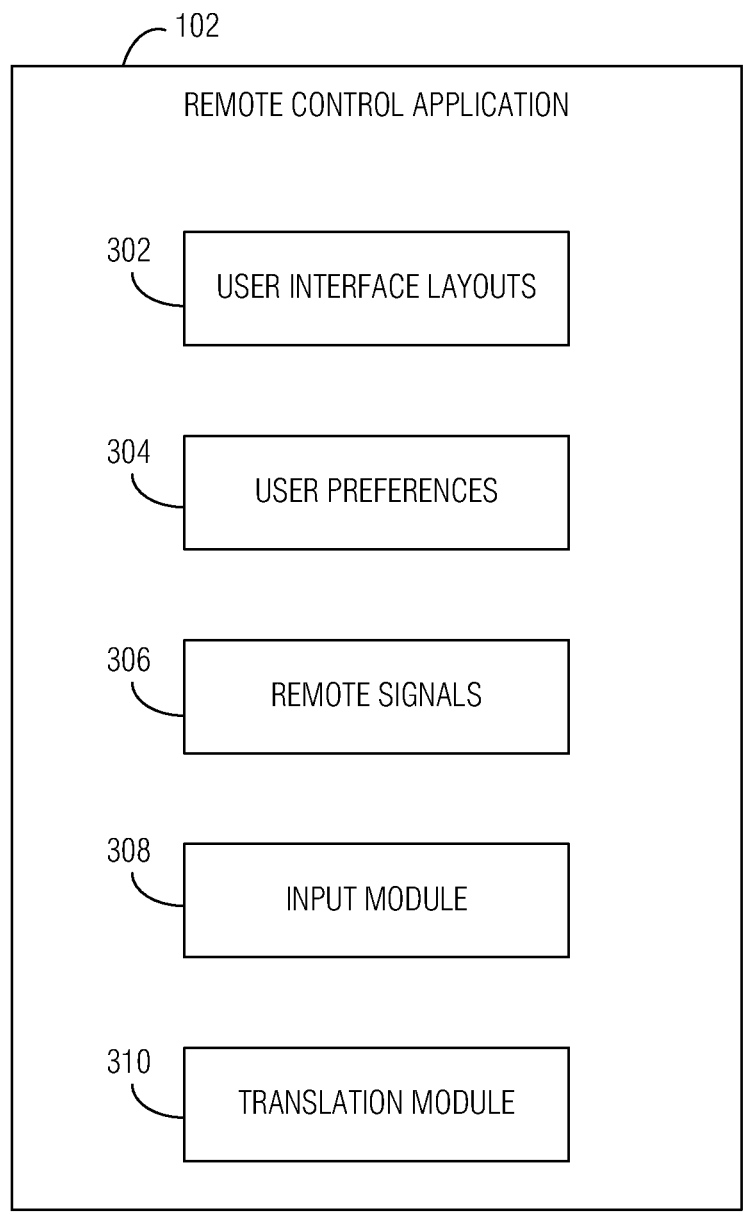
FIG. 3 is a block diagram of a remote control application, according to an example embodiment.

FIG. 3 is a block diagram of remote control application 102. In various embodiments, remote control application 102 is opened by a user of mobile device 100 or automatically by mobile device 100 when audio streaming device attachment 104 is connected to mobile device 100. To open remote control application 102 a user may click (e.g., touch) an icon representing remote control application 102 displayed on a display of mobile device 100. Remote control application 102 may initially be received and stored on mobile device 100 using RF receiver 204. In an embodiment, updates to remote control application 102 may be received using RF receiver 204.

FIG. 3 illustrates remote user interface layouts 302, user preferences 304, remote signals 306, input module 308, and translation module 310. User interface layouts 302, user preferences 304, and remote signals 306 may be stored as entries in one or more databases on mobile device 100. The databases may be structured in a variety of ways such as using a flat file structure or relational database. The databases may be updated during an update to remote control application 102 or by actions of a user of remote control application 102. In various embodiments, remote user interface layouts 302, and user preferences 304, remote signals 306 are stored as individual files.

In various embodiments, a remote user interface layout includes a layout of a set of user interface input elements to display on a display of the mobile device. For example, a remote user interface layout may resemble the look of a remote control layout used to control audio features of a hearing aid device or an audio streaming device. In an embodiment, a layout is defined using a standardized language (e.g., XML). Layouts may defined according to: (1) compatibility (2) actions associated with the user elements; (3) graphical representations of the user elements; and (4) locations of the user input elements.

In an embodiment, a layout is also associated with one or more models of hearing aid devices. Thus, certain layouts may not be compatible with all models of hearing aids. In yet another embodiment, compatibility may be defined at the a user interface element level. In this manner, a universal layout may be used with individual user interface elements shown or hidden based on the compatibility of the user interface element. In an embodiment, compatibility is defined as the match between the action associated with the user input element and an audio feature of the hearing aid device or audio streaming device.

In an example embodiment, a user input element is a graphical element that a user interacts with to cause an application to perform an assigned action for the input element. Actions that a user interface element are associated with include, but are not limited to, selecting a left or right hearing aid device, volume up, volume down, mute, unmute, play, stop, selecting an audio streaming source, lock, and unlock. For example, a button element may operate similarly to a mechanic button such that when a user activates (e.g., clicks) the button, an application program may increase the volume of an audio output.

In an example embodiment, a user interface input element is associated with a graphical representation of the action assigned to the user interface element. For example, a button element for turning the volume up on a hearing aid device may be associated with an electronic picture file (e.g., JPEG, GIF, PNG, etc.) of an arrow up.

In various embodiments, a layout further includes a location for each user interface input element. For example, a location includes an x-coordinate and a y-coordinate. In an embodiment, the location is an absolute location such that the location of an element does not change regardless of the size of the display. In another embodiment, the location is a relative location. For example, the location may be defined with respect to the top, bottom, left-side, right-side, or center of the display.

In an embodiment, an initial set of remote user interface layouts may be part of the initial remote control application 102 download. Then, as new functionality is made available to various hearing aids or audio streaming devices, the layouts and associated user input element may be updated or entirely new layouts may be included with the updated remote control application download.

In an embodiment, user preferences 304 represent data associated with user preferences of a user. For example, an initial volume preference may be set. Other preferences may include a maximum volume level (e.g., expressed in decibels), a default hearing aid device model, and automatic playback when an audio streaming device is determined to be within range of the user.

In an embodiment, remote signals 306 represent the messages to be encoded and transmitted to a hearing aid device. For example, remote signals may be stored for each of the actions associated with the user input elements of a remote layout. Thus, remote signals may be stored for a selection of a left or right hearing aid device, volume up, volume down, mute, unmute, play, stop, and selection an audio streaming source. As different hearing aid devices may need different signals to achieve the same action, multiple remote signals may be stored for each action.

In an embodiment, input module 308 processes user interactions with the remote control application. This includes interactions with user input elements of a remote layout as well as interactions with user input elements to set user preferences. For example, the input module may be configured to receive the selection at least one user input element of a remote layout. The input module may determine based on where the user clicks on the display of the mobile device which user input element has been selected. In an embodiment, a user selection is based on the coordinates of input device (e.g., stylus, cursor, finger of the user) as it makes contact with the display. The coordinates are compared to the coordinates of the user input element to determine the selection.

In an embodiment, at the point of selection the remote control application executes the action associated with the user input element. For example, if the user input element is determined to be a volume up button, the volume up action is executed. This may include executing functions to increase the volume of the hearing aid device of the user. Executing functions may include routing data to other modules of the remote control application such as translation module 310 or other components of a mobile device such as a transmitter attachment.

In an embodiment, translation module 310 is configured to translate the selection of the user input element into a remote signal for controlling an audio feature of the hearing assistance device. This may include, for example, determining the type of the hearing assistance device (e.g., as set by the user or by requesting it from the hearing assistance device). Then, retrieving the remote signal from a database of remote signals based on the type of the hearing assistance device and the action associated with the user input element. The action may be an audio feature (e.g., volume control) of a hearing assistance device. In an embodiment, translation module 310 is configured to encode the retrieve remote signal remote signal for transmission to the hearing assistance device. The encoded signal may then be routed to a transmitter attachment of a mobile device for transmission.

Figure 4:
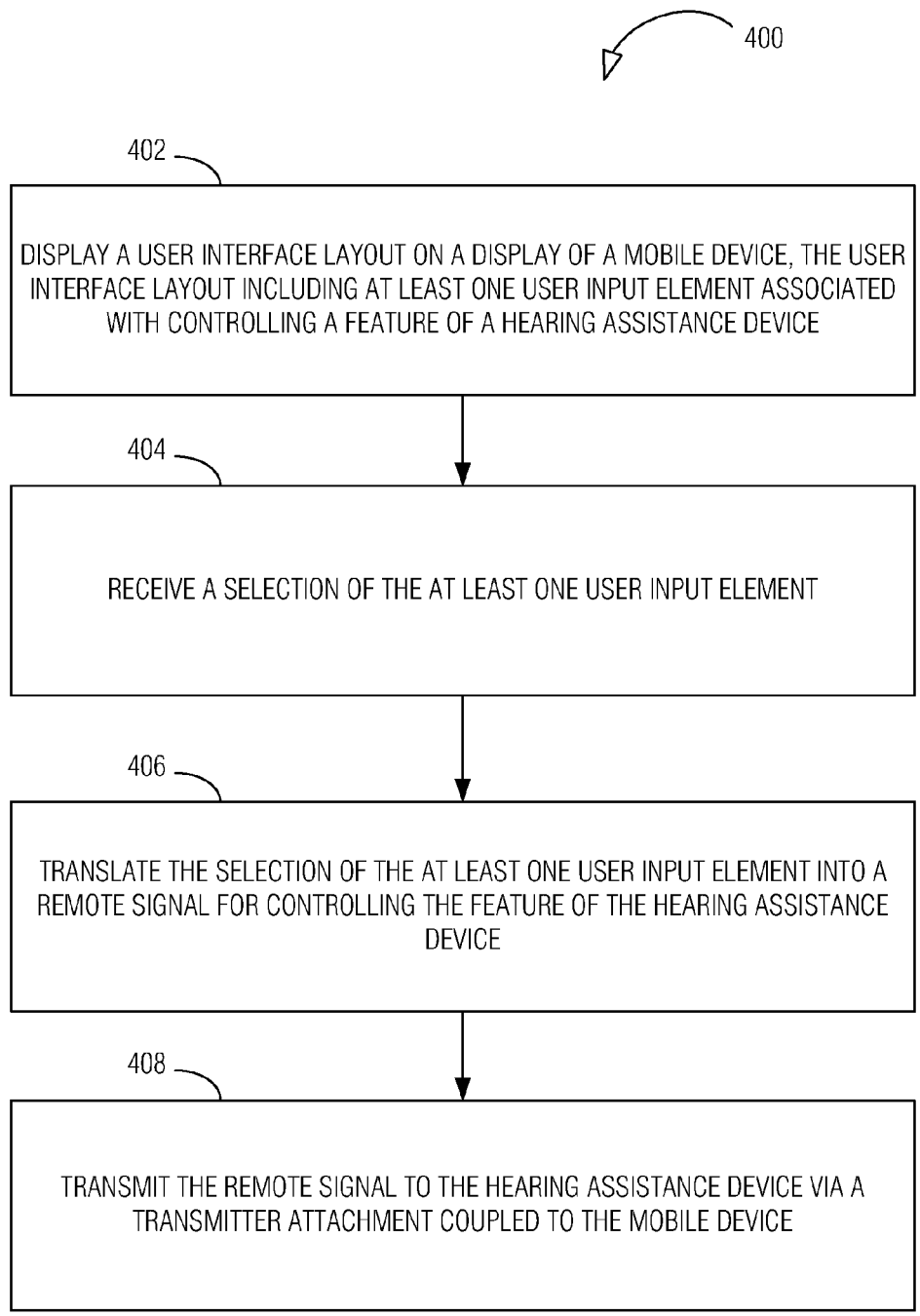
FIG. 4 is a flowchart illustrating operations of a method of using a remote control application for controlling a hearing assistance device, according to an example embodiment.

FIG. 4 is a flowchart 400 illustrating operations of a method of using a remote control application for controlling a hearing assistance device. In an embodiment, at block 402, a user interface layout is displayed on the display of a mobile device. The user-interface layout may include at least one user input element associated with controlling a feature (e.g., audio) of a hearing assistance device. These features may include but are not limited to selecting a left or right hearing aid device, volume up, volume down, mute, unmute, play, stop, selecting an audio streaming source, lock, and unlock. In an embodiment, the displayed layout is retrieved from a database of layouts based on the type of the hearing assistance device of the user. The type of hearing assistance device may be determined according to a user preference inputted by the user.

A user may independently change the volume of the left or right hearing aid based on the selection of the user interface element corresponding to the selection of the left or right hearing aid. Playback control such as muting and stopping playback may be specific to the audio streaming device that is currently being played through the speaker of the hearing assistance device. For example, the display may include a user interface element which directs audio playback to start with respect to a transmitter attached to mobile device and include a user element to stop playback with respect to a transmitter attached to TV.

At block 404, in an embodiment, a selection of at least one user element is received. For example, the selection may be received using a touchscreen interface on a mobile device. At block 406, in an embodiment, the selection of the user input element into is translated into a remote signal for controlling the feature of the hearing assistance device. For example, translating may include determining the type of the hearing assistance device and retrieving the remote signal from a database of remote signals based on the type of the hearing assistance device and the feature of the hearing assistance device associated with the user input element.

At block 408, in an embodiment, the remote signal is transmitted to the hearing assistance device via a transmitter attachment coupled to the mobile device. In an embodiment, an audio signal associated with audio data stored on the mobile device is transmitted via the transmitter attachment. For example, a user interface element may be selected which directs the mobile device to route audio to the transmitter attachment where it is encoded and transmitted over a RF (e.g., 900 MHz).

The present subject matter can be used for a variety of hearing assistance devices, including but not limited to, cochlear implant type hearing devices, hearing aids, such as behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, such as receiver-in-the-canal (RIC) or receiver-in-the-ear (RITE) designs. It is understood that other hearing assistance devices not expressly stated herein may fall within the scope of the present subject matter.

A Computer System

Figure 5:
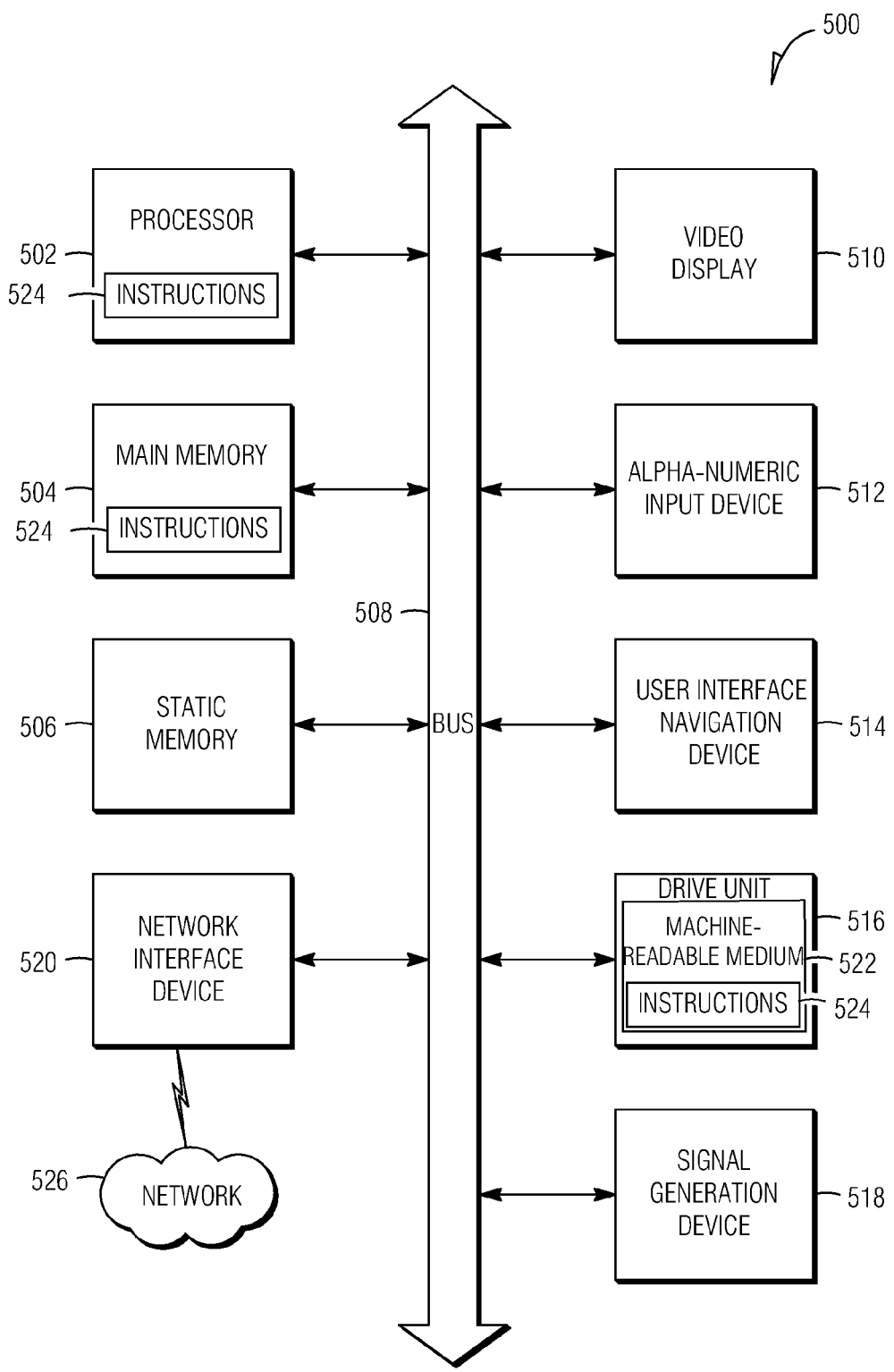
FIG. 5 illustrates a computer system, according to an example embodiment.

FIG. 5 shows a diagrammatic representation of a machine in the example form of a computer system 500 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 500 includes a processor 502 (e.g., a Central Processing Unit (CPU), a Graphics Processing Unit (GPU) or both), a main memory 501 and a static memory 506, which communicate with each other via a bus 508. The computer system 500 may further include a video display unit 510 (e.g., a Liquid Crystal Display (LCD) or a Cathode Ray Tube (CRT)). The computer system 500 also includes an alphanumeric input device 512 (e.g., a keyboard), a User Interface (UI) cursor controller 514 (e.g., a mouse), a disk drive unit 516, a signal generation device 518 (e.g., a speaker) and a network interface device 520 (e.g., a transmitter).

The disk drive unit 516 includes a machine-readable medium 522 on which is stored one or more sets of instructions 524 and data structures (e.g., software) embodying or used by any one or more of the methodologies or functions illustrated herein. The software may also reside, completely or at least partially, within the main memory 501 and/or within the processor 502 during execution thereof by the computer system 500, the main memory 501 and the processor 502 also constituting machine-readable media.

The instructions 524 may further be transmitted or received over a network 526 via the network interface device 520 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method comprising:
   determining the type of a hearing assistance device;
   displaying a user interface layout on a display of a mobile device, the user interface layout including at least one user input element associated with controlling an audio feature of the hearing assistance device, wherein the user interface layout is retrieved based on the type of the hearing assistance device;
   receiving a selection of the at least one user input element;
   translating the selection of the at least one user input element into a remote signal for controlling the audio feature of the hearing assistance device, the audio feature of the hearing assistance device controlling playback of an audio signal received at the hearing assistance device from a transmitter not connected to the mobile device, wherein the remote signal is retrieved based on the type of the hearing assistance device and the feature of the hearing assistance device associated with the user input element; and
   transmitting the remote signal to the hearing assistance device via a transmitter attachment coupled to the mobile device.

2. The method of claim 1, further comprising:
   transmitting, via the transmitter attachment, an audio signal associated with audio data stored on the mobile device.

3. The method of claim 2, further comprising receiving selection of another user input element and translating the selection of the another user input element into a remote signal for stopping the audio signal associated with audio data stored on the mobile device from playing on the hearing assistance device.

4. The method of claim 1, wherein the audio feature of the hearing assistance device is stopping the audio signal transmitted from a transmitter not connected to the mobile device from playing on the hearing assistance device.

5. The method of claim 1, wherein receiving the selection of the at least one user input element comprises receiving the selection using a touchscreen interface of the mobile device.

6. A system comprising:
   a hearing assistance device;
   a user interface layout displayed on a display of a mobile device, the user interface layout including at least one user input element associated with controlling an audio feature of the hearing assistance device, the user interface layout retrieved according to a determined type of hearing assistance device;

an input module configured to receive a selection of the at least one user input element;

a translation module configured to determine the type of the hearing assistance device and translate the selection of the at least one user input element into a remote signal for controlling the audio feature of the hearing assistance device, the audio feature of the hearing assistance device controlling playback of an audio signal received at the hearing assistance device from a transmitter not connected to the mobile device, wherein the remote signal is retrieved based on the type of the hearing assistance device and the feature of the hearing assistance device associated with the user input element; and a transmitter attachment coupled to the mobile device to transmit the remote signal to the hearing assistance device.

7. The system of claim 6, where the transmitter attachment transmits an audio signal associated with audio data stored on the mobile device.

8. The system of claim 7, wherein the input module is configured to receive selection of another user input element and wherein the translation module is configured to translate the selection of the another user input element into a remote signal for stopping the audio signal associated with audio data stored on the mobile device from playing on the hearing assistance device.

9. The system of claim 6, wherein the audio feature of the hearing assistance device is stopping the audio signal transmitted from a transmitter not connected to the mobile device from playing on the hearing assistance device.

10. The system of claim 6, wherein the selection of the at least one user input element is selected using a touch-screen interface of the mobile device.

11. A non-transitory machine-readable media comprising instructions which when executed by at least one processor cause the processor to perform operations comprising:

determining the type of a hearing assistance device;

displaying a user interface layout on a display of a mobile device, the user interface layout including at least one user input element associated with controlling an audio feature of a hearing assistance device, wherein the user interface layout is retrieved based on the type of the hearing assistance device;

receiving a selection of the at least one user input element;

translating the selection of the at least one user input element into a remote signal for controlling the audio feature of the hearing assistance device, the audio feature of the hearing assistance device controlling playback of an audio signal received at the hearing assistance device from a transmitter not connected to the mobile device, wherein the remote signal is retrieved based on the type of the hearing assistance device and the feature of the hearing assistance device associated with the user input element; and transmitting the remote signal to the hearing assistance device via a transmitter attachment coupled to the mobile device.

12. The non-transitory machine-readable media of claim 11, the operations further comprising:

transmitting, via the transmitter attachment, an audio signal associated with audio data stored on the mobile device.

13. The non-transitory machine-readable media of claim 12, wherein one of the at least user elements is an audio feature of the hearing assistance device to stop the audio signal from playing on the hearing assistance device.

14. The non-transitory machine-readable media of claim 11, wherein the audio feature of the hearing assistance device is stopping the audio signal transmitted from a transmitter not connected to the mobile device from playing on the hearing assistance device.

15. The non-transitory machine-readable media of claim 11, wherein receiving the selection of the at least one user input element comprises receiving the selection using a touch-screen interface of the mobile device.

* * * * *